(12) United States Patent
Sasai et al.

(10) Patent No.: US 9,378,719 B2
(45) Date of Patent: Jun. 28, 2016

(54) TECHNIQUE FOR ANALYZING RHYTHM STRUCTURE OF MUSIC AUDIO DATA

(71) Applicant: Yamaha Corporation, Hamamatsu-Shi, Shizuoka-Ken (JP)

(72) Inventors: Dan Sasai, Hamamatsu (JP); Takuya Fujishima, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 13/956,165

(22) Filed: Jul. 31, 2013

(65) Prior Publication Data

US 2014/0033902 A1 Feb. 6, 2014

(30) Foreign Application Priority Data

Jul. 31, 2012 (JP) ................................ 2012-170313

(51) Int. Cl.
*G10H 1/40* (2006.01)
*G10H 1/42* (2006.01)
(Continued)

(52) U.S. Cl.
CPC .................. *G10H 1/40* (2013.01); *G06F 17/30* (2013.01); *G10H 1/36* (2013.01); *G10H 1/42* (2013.01); *G10H 2210/061* (2013.01);
(Continued)

(58) Field of Classification Search
CPC ............. G10H 1/40; G10H 1/42; G10H 1/36; G10H 2210/071; G10H 2210/341; G06F 17/30; G06F 17/30864
USPC ............................................. 84/611; 707/769
See application file for complete search history.

(56) References Cited

U.S. PATENT DOCUMENTS 5,393,927 A * 2/1995 Aoki ........................ G10H 1/36
84/631
5,457,282 A * 10/1995 Miyamoto ............... G10H 1/36
84/634

(Continued)

FOREIGN PATENT DOCUMENTS

JP 2000-163064 A 6/2000
JP 2008-275975 A 11/2008
JP 2008275975 A * 11/2008

OTHER PUBLICATIONS

Notice of Grounds for Rejection (Office Action) mailed Mar. 29, 2016, for JP Patent Application No. 2012-170313, with English translation, four pages.

*Primary Examiner* — David Warren
*Assistant Examiner* — Christina Schreiber
(74) *Attorney, Agent, or Firm* — Morrison & Foerster LLP

(57) ABSTRACT

When a music audio to be analyzed is to be divided into a plurality of possible pattern segments based on estimated beat positions, it is divided in a plurality of different ways according to individual division models obtained by sequentially shifting the leading or first beat position of the possible pattern segments. Such division can provide plural sets of possible pattern segments with each of the sets corresponding to one of the division models. For each of the sets, comparison is made between individual possible pattern segments and individual reference performance patterns. For each of the possible pattern segments of the set, at least one reference performance pattern that matches the possible pattern segment is determined. Then, at least one combination of reference performance patterns is identified for each of the sets of possible pattern segments. One optimal combination is selected from among the identified combinations.

20 Claims, 3 Drawing Sheets

(51) Int. Cl.
*G10H 1/36* (2006.01)
*G06F 17/30* (2006.01)

(52) U.S. Cl.
CPC ... *G10H 2210/071* (2013.01); *G10H 2210/341* (2013.01); *G10H 2240/141* (2013.01)

(56) References Cited

U.S. PATENT DOCUMENTS

| | | | | |
|---|---|---|---|---|
| 5,495,073 | A * | 2/1996 | Fujishima | G10H 1/0033 84/609 |
| 5,763,802 | A * | 6/1998 | Aoki | G10H 1/38 84/613 |
| 6,175,072 | B1 * | 1/2001 | Aoki | G10H 1/0025 84/636 |
| 6,294,720 | B1 * | 9/2001 | Aoki | G10H 1/42 84/611 |
| 7,132,595 | B2 * | 11/2006 | Lu | G10H 1/40 84/612 |
| 7,368,705 | B2 * | 5/2008 | Hare | G01D 5/2458 250/231.13 |
| 2002/0007722 | A1 * | 1/2002 | Aoki | G10H 1/0025 84/635 |
| 2005/0188821 | A1 * | 9/2005 | Yamashita | G10H 1/40 84/611 |
| 2006/0011045 | A1 * | 1/2006 | Yamashita | G06F 3/023 84/611 |
| 2006/0065105 | A1 * | 3/2006 | Iketani | G06F 17/30743 84/609 |
| 2006/0075886 | A1 * | 4/2006 | Cremer | G10H 1/40 84/635 |
| 2008/0078282 | A1 * | 4/2008 | Saijo | G10H 1/0008 84/611 |
| 2012/0192701 | A1 * | 8/2012 | Watanabe | G01H 1/40 84/622 |
| 2012/0271847 | A1 * | 10/2012 | Watanabe | G06F 17/30743 707/769 |
| 2012/0278358 | A1 * | 11/2012 | Watanabe | G06F 17/30743 707/769 |
| 2015/0013528 | A1 * | 1/2015 | Buskies | G10H 1/0041 84/611 |
| 2015/0013533 | A1 * | 1/2015 | Buskies | G10H 1/0066 84/645 |

* cited by examiner

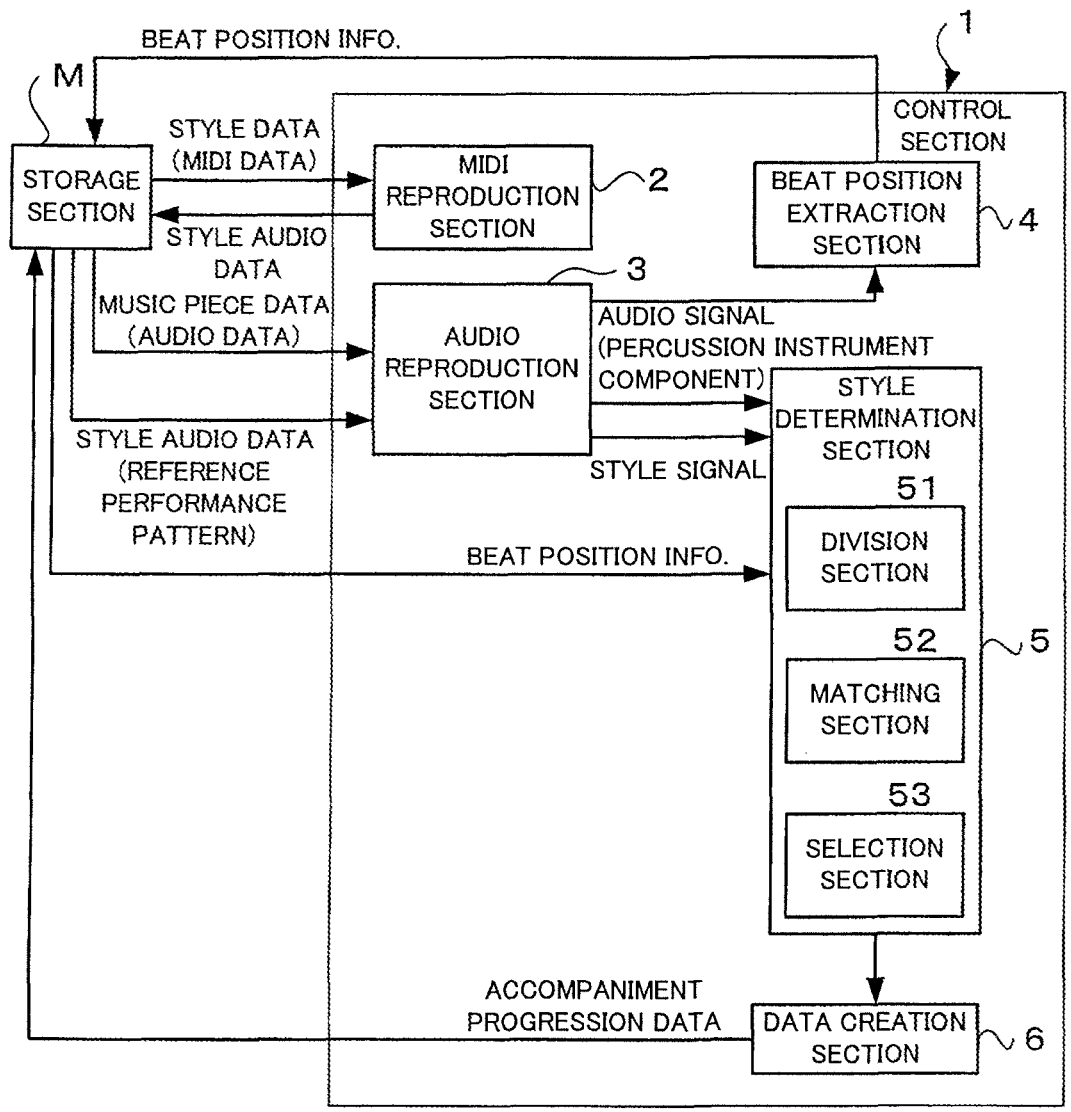
F I G. 1

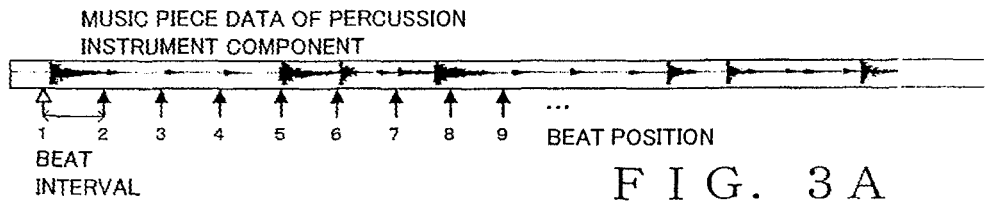
FIG. 3A
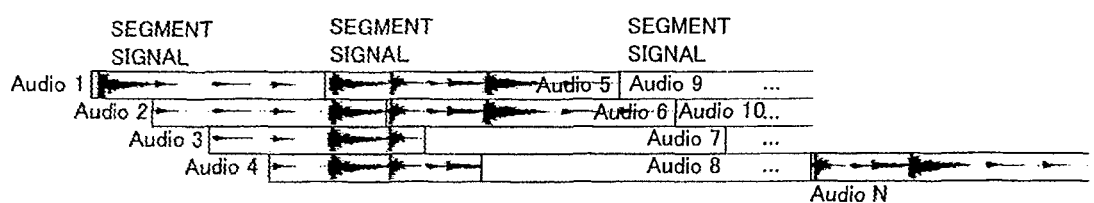
FIG. 3B
FIG. 3C
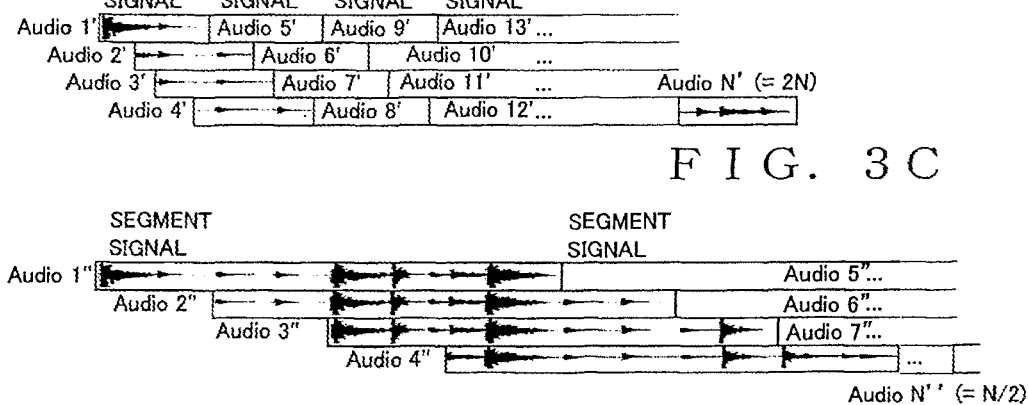
FIG. 3D
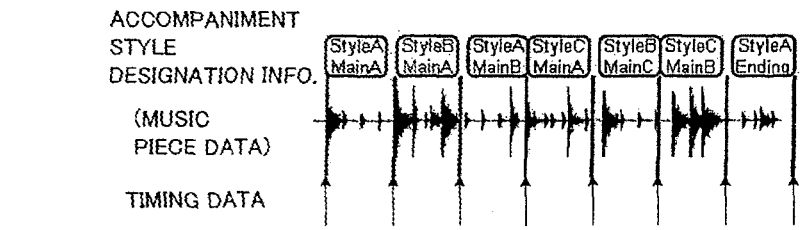
FIG. 3E

TECHNIQUE FOR ANALYZING RHYTHM STRUCTURE OF MUSIC AUDIO DATA

BACKGROUND

The present invention relates generally to techniques for analyzing a rhythm structure of a music audio data set. The present invention is applicable, for example, to apparatus and methods for creating accompaniment progression data by setting, in a performance progression order, accompaniment styles related to an accompaniment performance included in audio data of a music piece. The present invention relates more particularly to a technique for analyzing a music piece audio data set whose accurate beat positions are unknown and thereby identifying an accompaniment style having an accompaniment pattern most similar to an accompaniment performed in the music piece audio data set.

In the field of electronic musical instruments, sequencers, etc., it has been conventional to create in advance accompaniment progression data (also called "accompaniment sequence data") indicating accompaniment pattern data of which one of accompaniment styles, such as rock, pop and jazz and which one of sections, such as intro, main and ending, classified on an accompaniment-style-by-accompaniment-style basis are to be performed in what order. When a user wants to perform a desired music piece with a musical instrument, he or she selects accompaniment progression data matching the desired music piece and causes automatic accompaniment sounds to be audibly reproduced according to the selected accompaniment progression data by use of an electronic musical instrument or sequencer. Thus, while the user is executing a melody performance of the desired music piece with the musical instrument, automatic accompaniment sounds based on the selected accompaniment progression data can be simultaneously reproduced in response to the progression of the melody, and thus, the user can readily enjoy a musical instrument performance with accompaniment. An example of such a technique is disclosed in Japanese Patent Application Laid-open Publication No. 2000-163064 (hereinafter referred to as "Patent Literature 1").

Further, recently, a technique has been known which analyzes an audio signal to detect a rhythm pattern and then identifies a reference rhythm pattern most similar to the detected rhythm pattern by performing matching between the detected rhythm pattern and reference rhythm patterns pre-stored in a database or the like. In an apparatus disclosed in Japanese Patent Application Laid-open Publication No. 2008-275975 (hereinafter referred to as "Patent Literature 2"), for example, beat positions of an audio signal of a music piece are detected, time (or meter) and bar lines are determined on the basis of the detected beat positions, the audio signal is extracted per bar or measure on the basis of the determined bar lines, then a rhythm pattern is detected on the basis of a corresponding one of the extracted measure-by-measure audio signals, and then a reference rhythm pattern matching the detected rhythm pattern is identified. Namely, the prior art apparatus first determines bar lines in accordance with the detected beat positions, then a rhythm pattern is detected per measure based on the detected bar lines, and then performs rhythm pattern matching by comparing the detected rhythm pattern with the prestored reference rhythm patterns.

With the technique disclosed in Patent Literature 1, if accompaniment progression data has been created in advance, the user can, while executing a manual performance of a melody line, cause accompaniment, matching the melody line, to be performed with a simple operation. However, in a case where the user wants to perform manually, together with an automatic accompaniment, a music piece recorded on a newly released CD, for example, the user has to newly create accompaniment progression data matching the new music piece. But, in such a case, it is very likely that the user does not know which section data (hereinafter referred to also as "style data") of which an accompaniment style should be selected. Even if the user selects a style data set, judging the style data set to be suitable, it often turns out that the selected style data set does not match the music piece to be performed, when the automatic accompaniment is actually executed. Thus, the user has no other choice than to create accompaniment progression data while applying suitable style data sets and confirming how the data sets work on a trial-and-error basis, but such operations tend to be very troublesome and time-consuming.

Therefore, it is conceivable to use the disclosed technique of Patent Literature 2 to analyze a rhythm pattern of the music piece and then create accompaniment progression data on the basis of the rhythm pattern analysis. However, because the disclosed technique of Patent Literature 2 detects positions of bar lines on the basis of beats detected through beat position detection of the audio signal, the detected positions of bar lines are not necessarily accurate. Namely, with the conventionally-known beat position detection scheme, it is difficult to accurately detect each beat of the meter of the music piece, and a half beat, two beats or the like may often be erroneously detected as one beat. In a case where tones or sounds of half notes occur successively over a plurality of measures from the beginning of a music piece of four-four time, for example, a length of a half note may be erroneously recognized as one beat, and a length of two measures may be detected as one measure. Further, in a case where sounds of eighth notes occur successively over a plurality of measures from the beginning of a music piece of four-four time, for example, a length of an eighth note may be erroneously recognized as one beat, and a length of a half measure may be detected as one measure. A rhythm pattern detected in accordance with bar line positions that may be inaccurate cannot necessarily be a rhythm pattern accurately reflecting therein a performance. Therefore, a style data set most similar to a performance pattern performed in the audio signal cannot necessarily be identified through matching between such an inaccurate rhythm pattern and the reference patterns.

SUMMARY OF THE INVENTION

In view of the foregoing prior art problems, it is an object of the present invention to provide an improved apparatus and method which can accurately analyze a rhythm structure of music audio data. It is another object of the present invention to provide an improved apparatus and program which can identify, through analysis of a music piece audio data set, a suitable accompaniment style having an accompaniment pattern most similar to an accompaniment contained or performed in the music piece audio data set.

In order to provide an improved apparatus for analyzing a rhythm structure of a music audio data set, which comprises: a beat position acquisition section adapted to acquire beat position information indicative of individual estimated beat positions of the music audio data set to be analyzed; a division section configured to divide the music audio data set into a plurality of possible pattern segments on the basis of the beat positions indicated by the beat position information acquired by the beat position acquisition section, the division section being configured to provide a plurality of sets of possible pattern segments by dividing the music audio data set in accordance with individual ones of the plurality of division models obtained by sequentially shifting the first beat position of the possible pattern segments; a reference performance pattern acquisition section adapted to acquire a plurality of reference performance patterns; a matching section configured to make comparison between individual ones of the possible pattern segments and individual ones of the reference performance patterns for each of the sets of possible pattern segments and, on the basis of the comparison, determine, for each of the possible pattern segments of the set, at least one reference performance pattern that matches the possible pattern segment; and a selection section configured to identify, on the basis of the at least one reference performance pattern determined by the matching section for each of the possible pattern segments, at least one combination of reference performance patterns, where one reference performance pattern is associated with each of the possible pattern segments, for each of the sets of possible pattern segments, and select one optimal combination from among the combinations identified for the sets of possible pattern segments.

According to the present invention, when the music audio data set is to be divided into a plurality of possible pattern segments on the basis of the estimated beat positions indicated by the beat position information, it is divided in a plurality of different ways, rather than in a single way, in accordance with the individual division models obtained by sequentially shifting the leading or first beat position of the possible pattern segments. Such division can provide a plurality of sets of possible pattern segments, each of the sets corresponding to one of the division models. A plurality of reference performance patterns are prepared in advance which cover various performance patterns (rhythm patterns). For each of the sets of possible pattern segments, round-robin comparison is made between individual ones of the possible pattern segments and individual ones of the reference performance patterns. Then, for each of the possible pattern segments of the set, at least one reference performance pattern that matches the possible pattern segment is determined on the basis of such comparison. The selection section identifies, on the basis of the at least one reference performance pattern determined for each of the possible pattern segments, at least one combination of reference performance patterns, where one reference performance pattern is associated with each of the possible pattern segments, for each of the sets of possible pattern segments. By one optimal combination being selected from among the combinations identified in the aforementioned manner, a pattern structure, i.e. a rhythm structure, of the analysis-target music audio data set can be presented as a chain of a plurality of reference performance patterns in the selected combination. Namely, according to the present invention arranged in the aforementioned manner, pattern matching is performed between the reference performance patterns and the variety of possible pattern segments divided in a plurality of different ways in accordance with the plurality of division models without bar lines being fixed. Thus, the present invention can effectively prevent a crucial error from occurring in pattern matching due to inaccurate detection of bar line positions as in the prior art, and thus, the present invention can accurately analyze a rhythm structure of the music audio data set.

In an embodiment, the apparatus of the invention further comprises a beat position correction section configured to correct the beat positions, indicated by the beat position information acquired by the beat position acquisition section, in response to selection by the selection section of the one optimal combination. Further, the division section may be configured to: divide the music audio data set into a plurality of first possible pattern segments on the basis of provisional beat positions coinciding with the beat positions indicated by the acquired beat position information and provide a plurality of sets of first possible pattern segments by dividing the music audio data set in accordance with individual ones of the plurality of division models; divide the music audio data set into a plurality of second possible pattern segments on the basis of beat positions indicated by the beat position information equal in number to an integral multiple of the provisional beat positions constituting the first possible pattern segments and provide a plurality of sets of second possible pattern segments by dividing the music audio data set in accordance with individual ones of the plurality of division models; and divide the music audio data set into a plurality of third possible pattern segments on the basis of beat positions indicated by the beat position information equal in number to an integral submultiple of the provisional beat positions constituting the first possible pattern segments and also provide a plurality of sets of third possible pattern segments by dividing the music audio data set in accordance with individual ones of the plurality of division models. Further, the beat position correction section may be configured to correct the beat positions indicated by the beat position information acquired by the beat position acquisition section if the one optimal combination selected by the selection section is a combination related to the second or third possible pattern segments. Thus, if the beat positions indicated by the beat position information are inaccurate, the aforementioned arrangements of the present invention can correct the inaccurate beat positions to accurate beat positions. For example, if beat positions have been erroneously detected with the length of each half note erroneously recognized as one beat in a music piece of four-four time, the present invention can correct the erroneously detected beat positions to accurate beat positions with the length of each quarter note recognized as one beat.

In an embodiment, the apparatus of the invention further comprises a bar line determination section configured to determine, on the basis of the possible pattern segments divided from the music audio data set in accordance with one of the division models that corresponds to the one combination selected by the selection section, positions of bar lines in the music audio data set to be analyzed. Such an arrangement can determine accurate bar lines in the music audio data set to be analyzed.

In an embodiment, the apparatus of the invention further comprises a performance progression data creation section configured to create performance progression data describing, in a performance progression order, performance pattern identification information identifying individual reference performance patterns that constitute the one optimal combination of reference performance patterns selected by the selection section. The performance progression data can identify an appropriate accompaniment style having an accompaniment pattern most similar to an accompaniment contained or performed in the music audio data set.

Further, in an embodiment, the matching section calculates, for each of the sets of possible pattern segments, a degree of similarity of each of the possible pattern segments to each of the reference performance patterns and determines, for each of the possible pattern segments, a reference performance pattern having a relatively high degree of similarity as the at least one reference performance pattern that matches the possible pattern segment. Furthermore, the selection may be configured to evaluate an overall evaluation value of the degree of similarity for each of the identified combinations and select, as the one optimal combination, one of the combinations which has a relatively high overall evaluation value of the degree of similarity.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 1 is a functional block diagram showing an embodiment of an accompaniment progression creation apparatus to which is applied a technique for analyzing a rhythm structure of a music audio data set in accordance with the present invention;

FIGS. 3A to 3E are conceptual diagrams explanatory of style determination performed in the embodiment.

DETAILED DESCRIPTION

Figure 2:
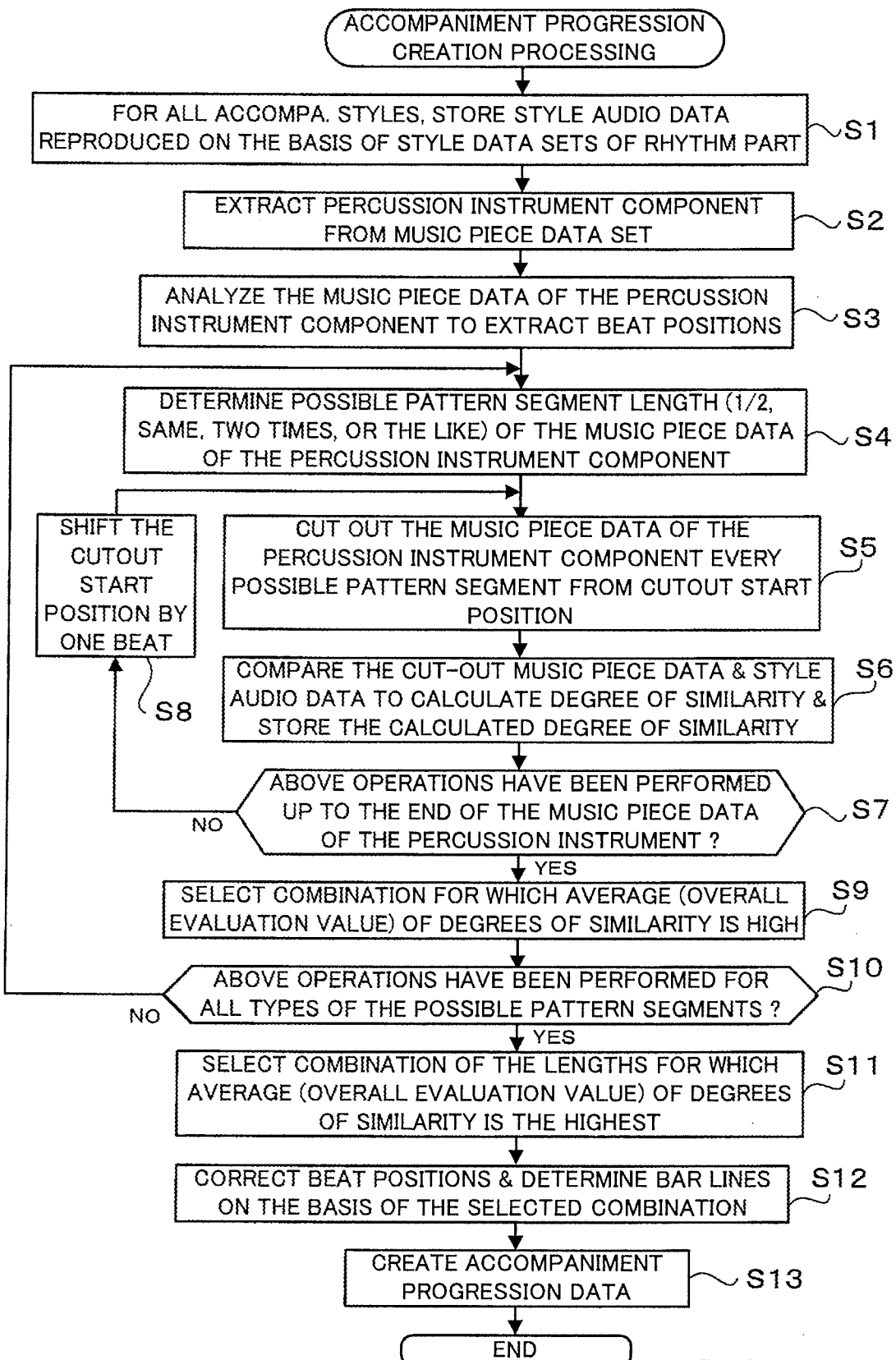
FIG. 2 is a flow chart showing an example operational sequence of accompaniment progression creation processing performed in the embodiment.

FIG. 1 is a functional block diagram showing an embodiment of an accompaniment progression creation apparatus of the present invention to which is applied a technique for analyzing a rhythm structure of music audio data (i.e., rhythm structure analysis technique) in accordance with the present invention. Arrows in FIG. 1 indicate flows of data. Whereas the accompaniment progression creation apparatus may have functions other than those shown in FIG. 1, the following description will be made in relation to a case where the accompaniment progression creation apparatus has the minimum necessary functions shown in FIG. 1.

The embodiment of the accompaniment progression creation apparatus of the present invention generally comprises a storage section M and a control section 1. The storage section M stores therein various data, such as music piece data sets that are objects of creation of accompaniment progression data (i.e., music audio data sets to be analyzed, or analysis-target music audio data sets), accompaniment style data sets (accompaniment pattern data sets) created by patterning performance contents corresponding to accompaniment styles (like rock, pop, jazz, etc.), and other data, and various application software programs, such as accompaniment progression creation processing (see FIG. 2), for execution or reference by the control section 1. Note that any desired music piece set may be selected by a user, as objects of creation of accompaniment progression data (i.e., as a music audio data to be analyzed), from among a multiplicity of music piece data sets stored in the storage section M.

Each of the music piece data sets is an audio data set indicative of performance sounds of a plurality of performance parts including a melody part and an accompaniment part, and such an audio data set comprises data created by digitizing audio signals of tones of the individual performance parts. Such music piece data sets may be ones created by the user or acquired from external equipment, such as a not-shown electronic musical instrument or CD player, or a server apparatus connected to the accompaniment progression creation apparatus via a communication network, such as the Internet. Let it be assumed that, in the instant embodiment, each music piece consistently has the same time or meter from the beginning to end thereof.

Further, each of the accompaniment style data sets comprises performance data of, for example, the MIDI format that are indicative of accompaniment parts, such as a rhythm part, a bass part and a chord backing part, and that are created by patterning performance data for each of accompaniment styles, such as rock, pop and jazz. Each of the style data sets comprises a plurality of section data, such as: main style data to be repetitively performed, mainly steadily, in a music piece; intro style data to be performed in an intro portion of the music piece; ending style data to be performed in an ending portion of the music piece; and fill-in style data to be temporarily inserted in an important portion, such as a climax portion or melody change portion, of the music piece. Each of the above-mentioned section data is pattern data corresponding to the performance pattern. Namely, a performance pattern can be identified in accordance with an accompaniment style and a section. Note that the individual section data have different lengths, ranging from one measure to a plurality of measures, depending on the sections. In addition to such style data, each of the accompaniment style data sets includes various information, such as a length of the style (the number of measures constituting each performance pattern and the number of beats in each measure, i.e. time or meter). A multiplicity of performance patterns constituting accompaniment style data sets are used also as reference performance patterns (or reference rhythm patterns) for matching in the instant embodiment of the present invention; such reference performance patterns will hereinafter be referred to also as "matching reference performance patterns".

Each of the aforementioned sections may comprise a plurality of variations; for example, the main section may comprise main-A style data, main-B style data, etc. Further, of the accompaniment style data sets, data of each of the accompaniment parts other than the rhythm part are created on the basis of a chord of a reference key (e.g., C major key). Thus, needless to say, when the created data of the accompaniment part are to be developed into actual note data, the data are converted into sound pitches corresponding to a chord name (more specifically, chord's root note name) designated for a live performance. Further, accompaniment style data sets too may be acquired from external equipment (such as an electronic musical instrument or a server apparatus).

Further, in addition to the aforementioned, the storage section M stores therein style audio data, beat information, accompaniment progression data, etc. generated as necessary as the later-described accompaniment progression creation processing performed by the control section 1. The storage section M may be in the form of an external storage device, such as a hard disk, or a storage device using any of various detachable external storage media, such as a flexible disk (FD), compact disk (CD), magneto-optical disk (MO) and digital versatile disk (DVD). Alternatively, the storage section M may be in the form of a semiconductor memory, such as a RAM.

Further, the control section 1, which comprises a not-shown standalone computer comprising a CPU, a ROM and a RAM, is cable of executing any desired one of application software programs stored in the storage section M. In the instant embodiment, the control section 1 performs or implements various functions that correspond to a MIDI reproduction section 2, an audio reproduction section 3, a beat position extraction section 4, a style determination section 5 and a data creation section 6, by executing the later-described accompaniment generation processing (FIG. 2). Of course, the control section 1 is not limited to a standalone computer like a personal computer and may comprise suitable music equipment hardware having incorporated therein a processor unit performing functions equivalent to the aforementioned functions, a ROM unit and a RAM unit, or comprise dedicated integrated circuitry.

The MIDI reproduction section 2, which is capable of simultaneously reproducing audio signals of a plurality of tracks (performance parts), acquires a style data set (MIDI data set) from the storage section M and generates audio signals by reproducing the acquired style data set. In the instant embodiment, in order to generate matching reference performance patterns (or matching reference rhythm patterns), the MIDI reproduction 2 can generate audio signals of a length corresponding to a predetermined pattern length (e.g., length of one measure or a plurality of measures) only for the rhythm part, by selectively reproducing style data of only the rhythm part (percussion instrument part) of each of the accompaniment style data sets stored in the storage section M. The thus-generated audio signals are converted into digital audio data (hereinafter referred to as "style audio data") and then output from the MIDI reproduction section 2 for storage into the storage section M. The MIDI reproduction section 2 may employ any desired tone synthesis method, such as the waveform memory method, FM method, physical model method, harmonics synthesis method or formant synthesis method, or may employ any desired combination of these tone synthesis methods.

The audio reproduction section 3 acquires a music piece data set (music audio data set) and style audio data (audio data of a reference performance pattern) and then generates respective audio signals by reproducing these acquired data in accordance with a predetermined performance tempo. Further, the audio reproduction section 3 can separate the audio signals into a percussion instrument component (also referred to as "non-harmonic sound") and non-percussion instrument component (also referred to as "harmonic sound"). When audio signals are generated on the basis of the music piece data set as above, the audio reproduction section 3 in the illustrated example supplies only the separated audio signal of the non-percussion instrument component to the beat position extraction section 4 or the style determination section 5. The separation of the audio signals into the percussion instrument component and the non-percussion instrument component may be performed in any one of various methods, but such separation methods will not be described in detail here because they are known in the art.

In the instant embodiment, the construction in which all data to be used as matching reference performance patterns (or matching reference rhythm patterns) are selectively read out by the MIDI reproduction 2 from all of the accompaniment style data sets stored in the storage section M so that the MIDI reproduction section 2 generates audio signals of all of necessary reference performance patterns and stores the thus-generated audio signals into the storage section M and in which the audio reproduction section 3 then sequentially reads out the audio data of a plurality of reference performance patterns (style audio data) from the storage section M for the matching purpose, and a later-described operation of step S1 in FIG. 2 function as a reference performance pattern acquisition section suited to or adapted to acquire a plurality of reference performance patterns.

Note that the MIDI reproduction section 2 and the audio reproduction section 3 may be implemented by other than computer programs, such as microprograms processed by a DSP (Digital Signal Processor). Alternatively, the MIDI reproduction section 2 and the audio reproduction section 3 may be implemented as dedicated hardware devices including discrete circuits, integrated or large-scale integrated circuits, and/or the like.

Further, the beat position extraction section 4 detects beats in an audio signal of the percussion instrument component separated by the audio reproduction section 3 and extracts individual beat positions on the basis of the beat detection (see, for example, FIG. 3A). The thus-extracted beat positions are stored into the storage section M (shown as "beat position information" in FIG. 2). The beat position information comprises time data indicative of elapsed times from a reproduction start time of the music piece data set (music audio data set), which are represented, for example, by position information (e.g., sample point numbers) indicative of sample point positions of audio waveform data present at positions corresponding to the individual beat positions in the music piece data set (music audio data set), time information in an hour/minute/second/millisecond format or the like. The beat position extraction based on the beat detection in the audio signal may be performed in any one of various methods, but such beat position extraction methods will not be described in detail here because they are known in the art. Note that, in a case where beat position information indicative of beat positions extracted from the music piece data set has already been stored with the music piece data set or in the storage section M or the like, the beat position extraction section 4 only has to acquire such beat position information from the music piece data set or from the storage section M without executing the aforementioned beat detection operation. As set forth above as the prior art problem, beat positions detected on the basis of beat detection in an audio signal are not necessarily accurate, and such detected beat positions merely permit estimation of accurate beat positions. Thus, the beat positions extracted by the beat position extraction section 4 or the beat positions indicated by the stored beat position information are not necessarily accurate and may often be erroneous. Therefore, in the instant embodiment, the beat positions indicated by the beat position information are corrected with accurate beat positions after an accurate rhythm structure has been analyzed in accordance with the present invention. The construction in which individual beat positions are extracted by the beat position extraction section 4 or the construction where previously-stored beat position information is acquired from the storage section M, and an operation of step S3 in FIG. 2 function as a beat position acquisition section adapted to acquire beat position information that estimates individual beat positions in a music audio data set to be analyzed.

By performing the following processing, the style determination section 5 identifies, for each pattern segment length corresponding to one or a plurality of measures, an accompaniment style (more specifically, style data set) having a performance pattern most similar to an accompaniment pattern contained or performed in a music audio data set (music piece data set) that is to be analyzed; such a music audio data set to be analyzed will hereinafter be referred to also as "analysis-target music audio data set". For simplification of the following description, let it be assumed that the time or meter of a music piece is four-four (4/4) and one pattern segment length for which matching is to be performed is one measure, although the present invention is not so limited and the one pattern segment length for the matching may be one or a plurality of measures depending on a length of a reference performance pattern. In a case where the analysis-target music audio data set is divided equally for simplification of later-described division models, the one pattern segment length for the matching may be uniformly fixed at a predetermined number of measures (one measure, two measures, four measures or the like), and the length of the reference performance patterns may be adjusted to coincide with the one pattern segment length fixed at the predetermined number of measures. In such a case, if two measures are chosen as the above-mentioned predetermined number of measures, and if one pattern length of an original accompaniment style is four measures, the one pattern of the original accompaniment style may be divided into two so that two reference performance patterns each having a length of two measures can be prepared for the matching purpose.

The style determination section 5 first acquires, from the audio reproduction section 3, an audio signal of the percussion instrument component generated as a music piece data set is reproduced, but also acquires previously stored beat position information from the storage section M, and then, in preparation for matching with reference performance patterns prepared from (included in) an accompaniment style, it divides or fragments the acquired audio signal of the percussion instrument component into a plurality of segments by sequentially clipping or cutting out the audio signal, by a predetermined number of beats (e.g., four beats in this case) corresponding to the length of the reference performance pattern at a time, on the basis of the acquired beat position information. At that time, the style determination section 5 sequentially cuts out the audio signal of the percussion instrument component into "segment signals", by the same number of beats as the length (number of beats) of the style at a time, while shifting a cutout start position of the audio signal by a predetermined number of beat (e.g., one beat) in accordance with a progression of the currently reproduced music piece. In the illustrated example, the audio signal of the percussion instrument component is sequentially fragmented or divided and cut out, by four beats at a time, in such a manner that individual divided segment groups have mutually-partly-overlapping portions like "segment of first to fourth beats", "segment of second to fifth beats", "segment of fourth to seventh beats" and so on (see for example FIG. 3B). Because any one of the segments having such partly-overlapping portions is likely to be a pattern segment, they will hereinafter be referred to as "possible pattern segments". More specifically, such a cutout or division function is performed by a division section 51 included in the style determination section 5.

Namely, the division section 51 is constructed or configured to divide the analysis-target music audio data set into a plurality of possible pattern segments on the basis of the beat positions indicated by the acquired beat position information, and it is also configured to provide a plurality of sets of possible pattern segments by dividing the music audio data set in accordance with individual ones of a plurality of division models obtained by sequentially shifting the first beat position of the possible pattern segments. In the aforementioned example, each of the possible pattern segments has a length of four beats, and the number of the division models is four. Namely, the four division models are: a first division model for sequentially dividing the analysis-target music audio data set every four beats from the leading or first beat; a second division model for sequentially dividing the analysis-target music audio data set every four beats from the second beat; a third division model for sequentially dividing the analysis-target music audio data set every four beats from the third beat; and a fourth division model for sequentially dividing the analysis-target music audio data set every four beats from the fourth beat. Thus, in the illustrated example, a total of four groups or sets of a plurality of possible pattern segments each having four beats (four-beat possible pattern segments) are provided, which are: a set of a plurality of four-beat possible pattern segments divided from the analysis-target music audio data set in accordance with the first division model and starting with the "segment of first to fourth beats"; a set of a plurality of four-beat possible pattern segments divided from the analysis-target music audio data set in accordance with the second division model and starting with the "segment of second to fifth beats"; a set of a plurality of four-beat possible pattern segments divided from the analysis-target music audio data set in accordance with the third division model and starting with the "segment of third to sixth beats"; and a set of a plurality of four-beat possible pattern segments divided from the analysis-target music audio data set in accordance with the fourth division model and starting with the "segment of fourth to seventh beats". Note that the length of each of the four-beat possible pattern segments is set to correspond to the number of measures of each of the reference performance patterns.

The style determination section 5 compares the individual cut-out segment signals with individual ones of a plurality of audio signals sequentially generated by the audio reproduction section 3 on the basis of all of style audio data stored in the storage section M (hereinafter referred to as "style signals"). Namely, by performing matching, in a so-called "round-robin" fashion, between the individual segment signals and individual style data sets (more specifically, style data sets of the rhythm part) of all of the accompaniment styles stored in the storage section M, the style determination section 5 evaluates a degree of similarity of each of the segment signals to each one of a multiplicity of style signals. Thus, a degree of similarity between each of the segment signals and each of the style signals and hence the style data set from which the style signal has originated is evaluated; for example, a degree of similarity between the segment signal of the "segment of first to fourth beats" and the style signal generated on the basis of main-A style data (rock, pop, jazz, etc.) is evaluated as "80%", a degree of similarity between the segment signal of the "segment of first to fourth beats" and the style signal generated on the basis of main-B style data (rock, pop, jazz, etc.) is evaluated as "65%", a degree of similarity between the segment signal of the "segment of fifth to eighth beats" and the style signal generated on the basis of main-A style data (rock, pop, jazz, etc.) is evaluated as "90%", a degree of similarity between the segment signal of the "segment of fifth to eighth beats" and the style signal generated on the basis of main-B style data (rock, pop, jazz, etc.) is evaluated as "35%", and so on.

Such a matching function is performed by a matching section 52 included in the style determination section 5. Namely, the matching section 52 is constructed or configured to make comparison, for each of the sets of possible pattern segments, between individual ones of the possible pattern segments and individual ones of the reference performance patterns and, on the basis of the comparison, determine, for each of the possible pattern segments, at least one reference performance pattern matching the possible pattern segment.

Note that, for each of the sets of possible pattern segments, the matching section 52 may determine, for each of the possible pattern segments of the set, one reference performance pattern that most closely matches the possible pattern segment. Alternatively, the matching section 52 may be configured to determine a plurality of reference performance patterns as matching a given possible pattern segment, to leave room for selection by the user. In this case, such a plurality of reference performance patterns may be presented to the user via a visual display so that the user can select a reference performance pattern matching the given possible pattern segment from among the presented reference performance patterns. For example, if a reference performance pattern that most closely matches a possible pattern segment near the beginning of the music piece is from an ending section and a reference performance pattern that second most closely matches the possible pattern segment is from an intro section, then the user may sometimes prefer to select the second-most-closely-matching reference performance pattern from an intro section. This is why the matching section 52 is constructed to leave room for selection by the user as noted above.

Because the matching method for comparing two audio signals, such as the aforementioned segment signal and style signal, and evaluating a degree of similarity between the compared two audio signals is known per se in the art, just one example of the matching method will be briefed as follows. Envelopes indicative of variations over time in volume of two audio signals are obtained, and then a degree of similarity between the two audio signals is calculated by comparing the obtained envelopes after normalizing time-axial lengths of the two audio signals to conform to each other, regarding that the two audio signals have the same number of beats (e.g., four beats).

As apparent from the foregoing, a plurality of sets or combinations of a plurality of segment signals (possible pattern segments) that do not overlap one another and have no gaps therebetween are created through the processing by the division section 51 included in the style determination section 5, and for each of the plurality of sets and for each of the segment signals (possible pattern segments) of the set, a reference performance pattern matching the segment signal is determined through the processing by the matching section 52. Here, the combinations of a plurality of segment signals (possible pattern segments) that do not overlap one another and have no gaps therebetween are combinations of segment signals (divided possible pattern segments) sequentially cut out by the number of beats (four beats in the illustrated example) constituting one segment signal at a time. For example, a total of four combinations are determined, which are: a combination of "segment of first to fourth beats", "segment of fifth to eighth beats", "segment of ninth to twelfth beats", . . . ; a combination of "segment of second to fifth beats", "segment of sixth to ninth beats", "segment of tenth to thirteenth beats"; a combination of "segment of third to sixth beats", "segment of seventh to tenth beats", "segment of eleventh to fourteenth beats", . . . ; and a combination of "segment of fourth to seventh beats", "segment of eighth to eleventh beats", "segment of twelfth to fifteenth beats", . . . (see for example FIG. 3B). Namely, a particular number of combinations corresponding to a length (number of beats) of a style are determined. If the length of the style is three beats, then three combinations are determined in accordance with three division models. If the length of the style is eight beats, then eight combinations are determined in accordance with eight division models.

Then, one combination for which an average value (overall evaluation value) of the degrees of similarity of the individual segment signals to individual ones of given style data sets is the highest or relatively high is selected from among the four combinations determined in the aforementioned manner. Namely, any one of the combinations for which correlation of the individual segment signals with style data sets is high is selected. Then, one set of possible pattern segments corresponding to such a selected combination is determined as accurate pattern segments, and positions of bar lines are determined in accordance with the accurate pattern segments.

Such a selection function is performed by a selection section 53 included in the style determination section 5. Namely, the selection section 53 is constructed in such a manner that, on the basis of the at least one reference performance pattern determined by the matching section 52 for each of the possible pattern segments, the selection section 53 identifies, for each of the sets of possible pattern segments, at least one combination of reference performance patterns, where one reference performance pattern is associated with each of the possible pattern segments, and selects one optimal combination from among the thus-identified combinations. By the selection section 53 thus selecting the one optimal combination, a pattern structure, i.e. a rhythm structure, of the analysis-target music audio data set is presented as a chain of a plurality of reference performance patterns in the selected combination. Namely, by the selection section 53 selecting the one optimal combination, a pattern structure, i.e. a rhythm structure, of the analysis-target music audio data set is appropriately presented as a chain of a plurality of reference performance patterns in the selected combination. Further, because a pattern structure, i.e. a rhythm structure, of the analysis-target music audio data set is appropriately presented like this, accurate positions of bar lines in the analysis-target music audio data set are determined. Namely, positions of bar lines are automatically determined from the division model corresponding to the selected one optimal combination.

As an example, the selection section 53 may be constructed to identify at least one combination of reference performance patterns, where one reference performance pattern is associated with each of the possible pattern segments, by presenting to the user the at least one reference performance pattern, determined by the matching section 52 for each of the possible pattern segments, to allow the user to select one reference performance pattern per possible pattern segment. As another example, the selection section 53 may be constructed to select the one optimal combination by presenting to the user one or more of the identified combinations to allow the user to select one of the presented combinations.

Generally, in the case where beat positions of an audio signal are to be extracted on the basis of beat detection, the audio signal may be undesirably extracted in accordance with inaccurate beat positions as set forth above. In such a case, even if a degree of similarity is evaluated by performing matching between a segment signal and a style signal, the evaluated degree of similarity is not necessarily accurate, as noted above. If an accompaniment style is determined on the basis of such an inaccurate degree of similarity, it is very likely that a non-optimal accompaniment style will be undesirably determined. Thus, in order to address such an inconvenience, the division section 51 of the style determination section 5 in the instant embodiment is constructed to first divide an audio signal of the percussion instrument component into a plurality of first possible pattern segments on the basis of provisional beat positions coinciding with the beat positions indicated by the beat position information by sequentially dividing or segmenting the audio signal by a particular number of beats (e.g., four beats) equal to the number of beats of one pattern segment of the style at a time, but also divide the audio signal of the percussion instrument component in accordance with individual ones of the plurality of (i.e., four) of division models to thereby provide a plurality of (e.g., four) sets of first possible pattern segments. In addition, the division section 51 divides the audio signal of the percussion instrument component into a plurality of second possible pattern segments (or third possible pattern segments) on the basis of the beat positions indicated by the beat position information that are equal in number to an integral multiple (or integral submultiple) of the provisional beat positions constituting the first possible pattern segment, but also divides the audio signal of the percussion instrument component in accordance with individual ones of the plurality of (i.e., four) of division models to thereby provide a plurality of (e.g., four) sets of second possible pattern segments (or third possible pattern segments) (see, for example, FIGS. 3C and 3D). Then, one set of which correlation to each style data set is high is determined from among the sets (i.e., 4×3=12 sets in the illustrated example) of first to third possible pattern segments having been provided by the audio signal of the percussion instrument component being divided with the different numbers of beats that are the same as, ½ time, two times, etc. of the number of the detected beats.

Namely, the division section 51 is constructed to:

(1) divide the music audio data set into a plurality of first possible pattern segments on the basis of provisional beat positions coinciding with beat positions indicated by the acquired beat position information and also provide a plurality of sets of first possible pattern segments by dividing the music audio data set in accordance with individual ones of the plurality of division models;

(2) divide the music audio data set into a plurality of second possible pattern segments on the basis of beat posit ions indicated by the beat position information equal in number to an integral multiple of the provisional beat positions constituting the first possible pattern segments and also provide a plurality of sets of second possible pattern segments by dividing the music audio data set in accordance with individual ones of the plurality of division models; and (3) divide the music audio data set into a plurality of third possible pattern segments on the basis of beat positions indicated by the beat position information equal in number to an integral submultiple of the provisional beat positions constituting the first possible pattern segments and also provide a plurality of sets of third possible pattern segments by dividing the music audio data set in accordance with individual ones of the plurality of division models.

If the one optimal combination selected by the selection section 53 is a combination related to the first possible pattern segments, then the provisional beat positions indicated by the acquired beat position information indicate accurate beat positions. However, if the one optimal combination selected by the selection section 53 is a combination related to the second or third possible pattern segments, then the provisional beat positions indicated by the acquired beat position information do not indicate accurate beat positions, and the provisional beat positions of the second or third possible pattern segments indicate accurate beat positions. Thus, the beat positions indicated by the acquired beat position information are corrected if the one optimal combination selected by the selection section 53 is a combination related to the second or third possible pattern segments. For example, if beat positions have been erroneously detected with the length of each half note erroneously recognized as one beat, the aforementioned arrangements can correct the erroneously-detected beat positions to accurate beat positions with the length of each quarter note recognized as one beat.

Further, a data creation section 6 in FIG. 1 creates accompaniment progression data (performance progression data) on the basis of the bar lines determined in the aforementioned manner and the reference performance pattern (accompaniment style data set set) determined for each of the pattern segments. The accompaniment progression data created here comprises combinations of timing data time positions of the determined bar lines and information indicative of (or identifying) style data (e.g., accompaniment style names, section names, etc.) having the highest degree of similarity obtained for each of the segment signals and measures indicated by the determined bar lines, and such combinations of the timing data and the style data sets are arranged in a performance progression order. Namely, the data creation section 6 functions as a performance progression data creation section which creates performance progression data (accompaniment progression data) that describes, in a performance progression order, performance pattern identification information identifying individual reference performance patterns that constitute the one optimal combination of reference performance patterns.

Next, with reference to FIGS. 2 and 3, a description will be given about the accompaniment progression processing that implements the various functions shown in FIG. 1. More specifically, FIG. 2 is a flow chart showing an example operational sequence of the accompaniment progression processing performed in the instant embodiment. This accompaniment progression processing is performed by the control section (more specifically, computer) 1, for example, in response to an automatic "accompaniment progression data" creation instruction operation given by the user. FIGS. 3A to 3E are conceptual diagrams explanatory of style determination performed in the embodiment.

At step S1, the control section 1 generates style audio data (audio data of reference performance patterns) by sequentially acquiring accompaniment style data sets and selectively reproducing style data sets of a percussion instrument part, included in each of the accompaniment style data sets, and then it stores the generated style audio data into the storage section M provided, for example, in the RAM. Namely, for pattern comparison with a music piece data set, style data (MIDI data) sets are stored into the storage section M after its MIDI format being converted into the data format (audio format) of the music piece data set.

At step S2, a music piece data set selected, for example, by the user from among a plurality of music piece data sets (music audio data sets) stored in the storage section M is acquired as a music audio data set to be analyzed (i.e., as an analysis-target music audio data set), and only an audio signal of the percussion instrument component is separated and extracted from the acquired music audio data set. Namely, because a main performance part evidently reflecting therein a performance pattern in the acquired music audio data set is the rhythm part, the percussion instrument component and the non-percussion instrument component of the music audio data set are separated from each other in advance so that only the percussion instrument component (i.e., rhythm part) can be used in the instant embodiment. Note that a process for removing vocals and the like may be performed as preprocessing for separating the percussion instrument component and the non-percussion instrument component.

At next step S3, the extracted audio signal of the percussion instrument component is analyzed for beat detection etc. to extract beat positions. FIG. 3A shows example beat positions, where numerals "1" to "9" show the beat positions extracted by the beat detection. Because the beat position extraction method is known in the art, just one example of the beat position extraction method will be briefed as follows. As shown in FIG. 3A, for example, the first beat position "1" is determined first, and then the second beat position "2" is set at a position that is near a position a predetermined beat interval away from the first beat position "1" and that satisfies a predetermined correlation condition. Similarly, each of the succeeding beat positions (e.g., third position) is set at a position that is near a position the predetermined beat interval away from the preceding beat position (e.g., second beat position) and that satisfies a predetermined correlation condition.

Referring back to FIG. 2, a possible pattern segment length for cutting out (dividing) the percussion instrument component of the analysis-target music piece data set (music audio data to be analyzed) for the matching purpose is determined at step S4. Namely, for the matching between the music piece data set and a style data set, a length (possible pattern segment length) for fragmenting an audio signal of the percussion instrument component by sequentially cutting out, by a particular number of beats corresponding to a pattern length of a style (reference performance pattern) at a time, on the basis of the beat position information. However, with consideration for a case where beat positions have not been extracted accurately, the instant embodiment is constructed to, in addition to cutting out the percussion instrument component of the analysis-target music piece data set (music audio data to be analyzed) by dividing the percussion instrument component into a plurality of first possible pattern segments on the basis of provisional beat positions coinciding with the beat positions indicated by the acquired beat position information (FIG. 3B), cut out the percussion instrument component of the analysis-target music piece data set (music audio data to be analyzed) by dividing the percussion instrument component into a plurality of second possible pattern segments on the basis of beat positions indicated by the beat position information equal in number to an integral multiple of the provisional beat positions constituting the first possible pattern segments (FIG. 3D), and cut out the percussion instrument component of the analysis-target music piece data set by dividing the percussion instrument component music audio data set into a plurality of third possible pattern segments on the basis of beat positions indicated by the beat position information equal in number to an integral submultiple (e.g., ½ time) of the provisional beat positions constituting the first possible pattern segments (FIG. 3C). Namely, when the audio signal of the percussion instrument component is analyzed for beat detection to extract beat position, beats may sometimes be not detected accurately. For example, consider a case where a segment having a length of "four beats" is extracted from a music piece data set whose accurate tempo is 60 bpm (beat per minute). In such a case, if the length of the quarter note is accurately extracted as a beat, then the accurate tempo "60 bpm" is detected, so that a segment of four seconds corresponding to four beats is cut out from the music piece data set. However, if the length of the half note longer than the quarter note is erroneously detected as one beat (i.e., quarter note), "30 bpm" that is half the accurate tempo "60 bpm" is erroneously detected, so that a segment of eight seconds corresponding to inaccurate four beats is cut out from the music piece data set. Further, if the length of the eighth note shorter than the quarter note is erroneously detected as one beat (i.e., one quarter note), "120 bpm" that is two times the accurate tempo "60 bpm" is erroneously detected, so that a segment of two seconds corresponding to inaccurate four beats is cut out from the music piece data set. Thus, with consideration for the case where beats are erroneously detected at a tempo that is half or two times of the accurate tempo as noted above, the instant embodiment is constructed to fragment the audio signal of the percussion instrument component by setting the length of one beat at an integral submultiple (i.e., ½ time) or integral multiple (e.g., two times) of the length extracted through the beat detection, namely, by fragmenting and cutting the audio signal of the percussion instrument component into lengths each corresponding to a particular number of beats equal to the length of four beats of the accurate tempo. Needless to say, the integral submultiple and the integral multiple are not limited to ½ time and two times.

At next step S5, a segment signal is generated by the audio signal of the percussion instrument component being cut out for the determined possible pattern segment from the cutout start position. The first cutout start position is the leading or first beat position detected at the time of the beat detection. Let it be assumed that the following cutout start position is a position one beat after the first or initial cutout start position as will be later described in relation to step S8. At following step S6, music piece data (segment signal) of the cut-out percussion instrument component is compared with individual ones of the style audio data stored in the storage section M, so that degrees of similarity of the segment signal to the individual style audio data are calculated and stored into the storage section M.

At next step S7, a determination is made as to whether the aforementioned operations of steps S5 and S6 have been performed up to the end of the music piece data set of the percussion instrument component, i.e. whether the aforementioned operations of steps S5 and S6 have been completed for the entire music piece data set of the percussion instrument component. If the aforementioned operations of steps S5 and S6 have been performed up to the end of music piece data set of the percussion instrument component (YES determination at step S7), the accompaniment progression processing proceeds to step S9. If, on the other hand, the aforementioned operations of steps S5 and S6 have not yet been performed up to the end of music piece data set of the percussion instrument component (NO determination at step S7), the initial cutout start position is shifted by one beat at step S8, and then the accompaniment progression processing reverts to step S5. Namely, the operations of steps S5 and S6 are repeated until the aforementioned operations have been performed up to the end of music piece data set of the percussion instrument component.

Then, from among a plurality of combinations of the cut-out music piece data of the percussion instrument component which do not overlap one another and have no gaps therebetween, a combination having a high average of degrees of similarity to the style audio data is obtained at step S9. If the music piece data of the percussion instrument component has been divided into the first possible pattern segments on the basis of the provisional beat positions indicated by the beat position information (namely, four beats style), a total of four combinations: a combination of segment signals of "segment of first to fourth beats" (Audio 1), "segment of fifth to eighth beats" (Audio 5), "segment of ninth to twelfth beats" (Audio 9), ... (first group of data corresponding to the first possible pattern segments according to the first division model); a combination of segment signals of "segment of second to fifth beats" (Audio 2), "segment of sixth to ninth beats" (Audio 6), "segment of tenth to thirteenth beats" (Audio 10), ... (second group of data corresponding to the first possible pattern segments according to the second division model); a combination of segment signals of "segment of third to sixth beats"

(Audio 3), "segment of seventh to tenth beats" (Audio 7), . . . (third group of data corresponding to the first possible pattern segments according to the third division model); and a combination of segment signals of "segment of fourth to seventh beats" (Audio 4), "segment of eighth to eleventh beats" (Audio 8), . . . "segment of (N−3)th to Nth beats" (Audio N), (fourth group of data corresponding to the first possible pattern segments according to the fourth division model), are determined as the combinations of the cut-out music piece data of the percussion instrument component which do not overlap one another and have no gaps therebetween. FIG. 3C shows combinations of music piece data of the percussion instrument component divided into the third possible pattern segments on the basis of beat positions indicated by the beat position information equal in number to ½ time of the provisional beat positions constituting the first possible pattern segments (namely, two beats style), and FIG. 3D shows combinations of music piece data of the percussion instrument component divided into the second possible pattern segments on the basis of beat positions indicated by the beat position information equal in number to two times of the provisional beat positions constituting the first possible pattern segments (namely, eight beats style).

As noted above, degrees of similarity calculated for each of the segment signals "Audio 1" to "Audio N" by comparison with all of the style audio data are stored in the storage section M. Thus, a style data set of the highest degree of similarity is identified for each of the segment signals constituting the aforementioned four groups of data. For example, for the first group of data, the degree of similarity of main-A style data (rock, pop, jazz, etc.) to Audio 1 is "80%", the degree of similarity of main-B style data (rock, pop, jazz, etc.) to Audio 1 is "65%", the degree of similarity of main-C style data (rock, pop, jazz, etc.) to Audio 1 is "70%", the degree of similarity of main-A style data (rock, pop, jazz, etc.) to Audio 5 is "50%", the degree of similarity of main-B style data (rock, pop, jazz, etc.) to Audio 5 is "35%", and the degree of similarity of main-C style data (rock, pop, jazz, etc.) to Audio 5 is "70%". In such a case, main-A style data (rock, pop, jazz, etc.) is identified as most similar to Audio 1, and main-C style data (rock, pop, jazz, etc.) is identified as most similar to Audio 5. In this case, an average value of the degrees of similarity (namely, overall evaluation value) for this group of data is "75%". For each of the other groups of data, i.e. second to fourth groups of data, an average value of the degrees of similarity (namely, overall evaluation value) is evaluated in a similar manner to the aforementioned. Then, the average values of the degrees of similarity (namely, overall evaluation values) of the four groups of data (i.e., four combinations) are compared with one another so that any one of the four groups of data for which the obtained average value (namely, high overall evaluation value) of the degrees of similarity is high is determined.

The aforementioned operations of steps S4, S5, S8, etc. perform functions corresponding to the aforementioned division section 51. Namely, the aforementioned operations of steps S4, S5, S8, etc. are arranged to divide the analysis-target music audio data set into a plurality of possible pattern segments on the basis of the beat position indicated by the beat position information but also provide a plurality of sets of possible pattern segments by dividing the music audio data set in accordance with individual ones of the plurality of division models created by sequentially shifting the leading or first beat position of the possible pattern segments.

Further, the aforementioned operations of step S6 etc. perform functions corresponding to the aforementioned matching section 52. Namely, the aforementioned operations of step S6 etc. are arranged in such a manner that comparison is made between individual ones of the possible pattern segments and individual ones of the reference performance patterns for each of the sets of possible pattern segments, and that, for each of the possible pattern segments of the set, at least one reference performance pattern that matches the possible pattern segment is determined on the basis of the comparison.

Referring back to FIG. 2, a determination is made at step S10 as to whether the aforementioned operations of steps S5 to S9 have been performed for all types of the possible pattern segments (that are, for example, the first, second and third possible pattern segments) of the possible pattern segment of the music piece data set of the percussion instrument component. If the aforementioned operations of steps S5 to S9 have not yet been performed for all types of the possible pattern segments of the music piece data set of the percussion instrument component (NO determination at step S10), the accompaniment progression processing reverts to step S4 to repeat the operations of steps S4 to S10.

If the aforementioned operations of steps S5 to S9 have been performed for all types of the possible pattern segments of the music piece data set of the percussion instrument component (YES determination at step S10), a combination of reference performance patterns for which the obtained average value (overall evaluation value) of degrees of similarity is the highest of all combinations for which of the average value (overall evaluation value) of degrees of similarity is relatively high is selected (step S11). For example, of the twelve combinations shown in FIGS. 3B-3D, any one of the groups of data for which the average value (overall evaluation value) is the highest is selected. At next step S12, the beat positions are corrected and bar lines are determined on the basis of the selected combination of the highest average value (overall evaluation value). If any one of the combinations of reference performance patterns which corresponds to the segment signals divided into the second possible pattern segments (eight beats style) or the third possible pattern segments (two beats style) rather than the first possible pattern segments four beats style) has been selected, then the provisional beat positions extracted through the beat detection (indicated by the beat position information) are corrected with the assumption that provisional beat positions extracted through the beat detection (indicated by the beat position information) are inaccurate. For example, if the combination of reference performance patterns corresponding to the segment signals divided into the third possible pattern segments (two beats style) has been selected, the beat positions extracted through the beat detection are corrected, namely, two beats are added to each of the segment signals, in order to make the number of beats in each of the segment signals four rather than two. Further, if the combination of reference performance patterns corresponding to the segment signals divided into the second possible pattern segments (eight beats style) has been selected, the beat positions extracted through the beat detection are corrected, namely, four beats are reduced from each of the segment signals, in order to make the number of beats in each of the segment signals four rather than eight.

The aforementioned operations of steps S9, S11, etc. perform functions corresponding to the aforementioned selection section 53. Namely, the aforementioned operations of steps S9, S11, etc. are arranged to identify, for each of the sets of possible pattern segments, at least one combination of reference performance patterns, where one reference performance pattern is associated with each of the possible pattern segments, on the basis of the at least one reference performance patter selected for each of the possible pattern segments and selects one optimal combination from among the thus-identified combinations. The aforementioned operations of steps S9, S11, etc. are also arranged to obtain an overall evaluation value (average value) of the degrees of similarity for each of the identified combinations and select, as the one optimal combination, one of the combinations for which the obtained overall evaluation value is relatively high.

At step S13, accompaniment progression data is created, which comprises combinations of timing data corresponding to bar lines and accompaniment style designation information indicative of determined style data sets. In the accompaniment progression data set are automatically set a style data set having the highest degree of similarity in response to selection of a combination of reference performance patterns for which the average value of the degrees of similarity is the highest (see step S11 of FIG. 2). FIG. 3E shows an example of the accompaniment style designation information indicated by combinations of accompaniment style names (Style A, Style B, Style C, etc.) and section names (Main A, Main B, Main C and Ending). In this manner, accompaniment progression data is automatically created which indicates which section data, such as intro, main and ending classified on the accompaniment-style-by-accompaniment-style basis, of which accompaniment style are to be performed in what order. The aforementioned operation of step S13 performs functions corresponding to the data creation section 6. Namely, the aforementioned operation of step S13 is arranged to create performance progression data (accompaniment progression data) that describes, in a performance progression order, performance pattern identification information identifying individual reference performance patterns that constitute the selected one optimal combination of reference performance patterns.

As set forth above, the accompaniment progression creation apparatus of the present invention is constructed to extract beat positions (provisional or estimated beat positions) of a music piece data set and divide the music piece data set into a plurality of segment data (possible pattern segments) each having the same number of beats. At that time, the music piece data set is divided in a plurality of different ways, rather than in a single way, in accordance with the individual division models obtained by sequentially shifting the leading or first beat position of the possible pattern segments. In this manner, the accompaniment progression creation apparatus of the present invention creates, on the basis of the single music piece data set, a plurality of groups of data each comprising a combination of a plurality of segment data each having the same number of beats (see FIGS. 3B to 3D). Then, comparison is made between each of the segment data included in individual ones of the plurality of groups of data and individual ones of a plurality of prestored pattern data to calculate degrees of similarity of the performance patterns, and pattern data for which the calculated degree of similarity is the highest is identified for each of the segment data. Then, one group of data for which the identified pattern data has the highest correlation is selected from among the groups of data, and an accompaniment style is identified in accordance with selection of the group of data. Then, the beat positions of the music piece data set are corrected on the basis of the selected group of data, but also bar lines are determined in accordance with the corrected beat positions. Thus, even where inaccurate beat positions have been extracted from the music piece data set, the accompaniment progression creation apparatus of the present invention can appropriately identify an accompaniment style including a pattern most similar to a performance pattern contained or performed in the music piece data set. Further, the bar line positions determined in the afore-mentioned manner can be used for creation etc. of other data than accompaniment progression data where style data sets are arranged in a performance progression order as noted above. For example, the bar line positions determined in the aforementioned manner may be used to determine timing to reflect each chord in chord progression data (accompaniment progression data). The chord progression data is data where chords are arranged in a performance progression order and which is referenced when an accompaniment is to be performed on the basis of style data of a performance part other than the rhythm part.

Namely, according to the present invention, when the music audio data set is to be divided into a plurality of possible pattern segments on the basis of the provisional or estimated beat positions indicated by the beat position information, it is divided in a plurality of different ways, rather than in a single way, in accordance with the individual division models obtained by sequentially shifting the leading or first beat position of the possible pattern segments. Such division can provide a plurality of sets of possible pattern segments, each of the sets corresponding to one of the division models. The plurality of reference performance patterns are prepared in advance which cover various performance patterns (rhythm patterns). For each of the sets of possible pattern segments, round-robin comparison is made between individual ones of the possible pattern segments and individual ones of the reference performance patterns. Then, for each of the possible pattern segments of the set, at least one reference performance pattern that matches the possible pattern segment is determined on the basis of such comparison. The selection section identifies, on the basis of the at least one reference performance pattern determined for each of the possible pattern segments, at least one combination of reference performance patterns, where one reference performance pattern is associated with each of the possible pattern segments, for each of the sets of possible pattern segments. By one optimal combination being selected from among the combinations identified in the aforementioned manner, a pattern structure, i.e. a rhythm structure, of the analysis-target music audio data set can be presented as a chain of a plurality of reference performance patterns in the selected combination. Namely, according to the present invention arranged in the aforementioned manner, pattern matching is performed between the reference performance patterns and the variety of possible pattern segments divided in a plurality of different ways in accordance with the plurality of division models without bar lines being fixed. Thus, the present invention can effectively prevent a crucial error from occurring in pattern matching due to inaccurate detection of bar line positions as in the prior art, and thus, the present invention can accurately analyze a rhythm structure of the music audio data set.

Whereas one preferred embodiment of the present invention has been described above with reference to the accompanying drawings, the present invention is not so limited, and various other embodiments and modifications are also possible. For example, whereas the preferred embodiment of the present invention has been described above in relation to the case where the music piece data are audio data while the style data are MIDI data, the present invention is not so limited, and the music piece data may be MIDI data while the style data may be audio data. Alternatively, both the music piece data and the style data may be audio data. Particularly, the style data may be audio data of only a drum to be repetitively reproduced (i.e., reproduced in a looped fashion), of which the number of beats can be known (or extracted). In the case where the style data are audio data, no data format conversion is required, and thus, the operation of step S1 in FIG. 2 may be omitted or dispensed with. In the case where the music piece data are MIDI data, it is of course necessary to perform, prior to the operation of step S2 in FIG. 1, an operation for converting the MIDI data into the audio format.

Further, the rhythm structure analysis of the present invention has been described above as applied to an automatic accompaniment apparatus which uses style data of a typical style data format for automatic accompaniment, i.e. style data of a type that causes generation of automatic accompaniment sounds in a plurality of performance parts (percussion instrument part and backing instrument part) and that, for the backing instrument part, causes pitches of generated sounds to be processed in accordance with chord designation. However, the present invention is not so limited, and the rhythm structure analysis of the present invention is also applicable to automatic performance apparatus (automatic accompaniment apparatus) which use performance patterns (accompaniment patterns) of any other desired formats. For example, the present invention is also applicable to apparatus which use arpeggio-type performance patterns (accompaniment patterns) that cause a plurality of percussion instrument sounds to be automatically audibly generated in patterns similar to an arpeggio and that, in accordance with a key depression operation given on a keyboard, increase or decrease the number of percussion instrument sounds to be audibly generated.

Furthermore, whereas the preferred embodiment has been described as automatically selecting one optimal combination from among a plurality of combinations of reference performance patterns (style data sets) identified in association with or for a plurality of sets of possible pattern segments, the present invention is not so limited. For example, the present invention may be constructed to present to the user several candidate reference performance patterns (style data sets) of which the degree of similarity evaluated for each corresponding possible pattern segment is relatively high and thereby allow the user to select desired reference performance patterns (style data sets) from among the presented candidates and set a combination of the user-selected reference performance patterns (style data sets) style data in accompaniment progression data.

The above-described apparatus for analyzing a rhythm structure of a music audio data set or the accompaniment progression creation apparatus can be implemented as a system comprising a plurality of components remotely distributed on a communication network. Namely, an analyzing server system on the communication network may implement the present invention using hardware and software resources, provided in the analyzing server system, in response to receipt, from a user terminal connected to the communication network, of a request for analyzing a rhythm structure of a desired music audio data set.

This application is based on, and claims priority to, JP PA 2012-170313 filed on 31 Jul. 2013. The disclosure of the priority application, in its entirety, including the drawings, claims, and the specification thereof, are incorporated herein by reference.

What is claimed is:

1. An apparatus for analyzing a rhythm structure of a music audio data set, comprising:
   a beat position acquisition section configured to acquire beat position information indicating individual estimated beat positions of the music audio data set to be analyzed;
   a division section configured to:
   divide the music audio data set into a plurality of first possible pattern segments on the basis of provisional beat positions coinciding with the beat positions indicated by the acquired beat position information, each of the plurality of first possible pattern segments constituted by a number of the provisional beat positions, and provide a plurality of sets of first possible pattern segments by dividing the music audio data set in accordance with first individual division models of a plurality of division models so that a first beat position of each of the first possible pattern segments is shifted with respect to each other;
   divide the music audio data set into a plurality of second possible pattern segments on the basis of beat positions indicated by the beat position information equal in number to an integral multiple of the number of the provisional beat positions constituting the first possible pattern segments, and also provide a plurality of sets of second possible pattern segments by dividing the music audio data set in accordance with second individual division models of the plurality of division models so that a first beat position of each of the second possible pattern segments is shifted with respect to each other; and
   divide the music audio data set into a plurality of third possible pattern segments on the basis of beat positions indicated by the beat position information equal in number to an integral submultiple of the number of the provisional beat positions constituting the first possible pattern segments, and also provide a plurality of sets of third possible pattern segments by dividing the music audio data set in accordance with third individual division models of the plurality of division models so that a first beat position of each of the third possible pattern segments is shifted with respect to each other;
   a reference performance pattern acquisition section configured to acquire a plurality of reference performance patterns;
   a matching section configured to make comparisons between individual possible pattern segments with individual reference performance patterns for each of the sets of first, second, and third possible pattern segments and, on the basis of each comparison, determine, for each of the possible pattern segments of the set, at least one respective reference performance pattern that matches the possible pattern segment;
   a selection section configured to identify at least one combination of reference performance patterns on the basis of the at least one respective reference performance pattern determined by said matching section for each of the possible pattern segments, wherein each of the possible pattern segments within each of the sets of first, second, and third possible pattern segments is associated with one respective reference performance pattern, and the selection section further configured to select one optimal combination of reference performance patterns from among the at least one combination of reference performance patterns identified for the sets of first, second, and third possible pattern segments; and
   a beat position correction section configured to correct the beat positions in response to the selection of the one optimal combination of reference performance patterns by the selection section, wherein the beat positions are indicated by the beat position information acquired by said beat position acquisition section, and
   wherein said beat position correction section is configured to correct the beat positions if the one optimal combination of reference performance patterns selected by said selection section is a combination related to the second or third possible pattern segments.

2. The apparatus as claimed in claim 1, which further comprises a bar line determination section configured to determine positions of bar lines in the music audio data set to be analyzed, wherein the positions of bar lines are determined on the basis of the possible pattern segments that correspond to the one optimal combination selected by said selection section.

3. The apparatus as claimed in claim 1, which further comprises a performance progression data creation section configured to create performance progression data describing, in a performance progression order, performance pattern identification information identifying individual reference performance patterns that constitute the one optimal combination of reference performance patterns selected by said selection section.

4. The apparatus as claimed in claim 1, wherein said selection section presents to a user the at least one respective reference performance pattern, determined for each of the possible pattern segments, to allow the user to select one respective reference performance pattern for each of the possible pattern segments and thereby identifies a combination of reference performance patterns where one respective reference performance pattern is associated with each of the possible pattern segments.

5. The apparatus as claimed in claim 1, wherein said selection section presents to a user one or more of the identified combinations to allow a user to select one of the presented identified combinations and thereby selects the one optimal combination.

6. The apparatus as claimed in claim 1, wherein each of the possible pattern segments has a length corresponding to a number of measures of each of the reference performance patterns.

7. The apparatus as claimed in claim 1, wherein the music audio data set to be analyzed is a set of audio data of accompaniment performance sounds of a particular music piece,
   each of the reference performance patterns is a reference rhythm pattern, and
   said matching section determines an optimal rhythm pattern for each of the possible pattern segments on the basis of comparison between rhythms of individual possible pattern segments of the possible pattern segments and individual reference performance patterns of the reference performance patterns.

8. The apparatus as claimed in claim 1, wherein said matching section calculates, for each of the sets of first, second, and third possible pattern segments, a degree of similarity of each of the possible pattern segments to each of the reference performance patterns, wherein the calculated degree of similarity of the at least one respective reference performance pattern determined by said matching section for each of the possible pattern segments is relatively high.

9. The apparatus as claimed in claim 8, wherein said selection section is configured to evaluate, for each of the identified combinations of reference performance patterns, an overall evaluation value of the degree of similarity between the one or more reference performance patterns in the respective combination and the associated possible pattern segments in the respective combination, and select, as the one optimal combination, one of the identified combinations which has a relatively high overall evaluation value of the degree of similarity.

10. A computer-implemented method for analyzing a rhythm structure of a music audio data set, comprising:

an acquisition step of acquiring beat position information indicative of individual estimated beat positions of the music audio data set to be analyzed;

a division step of:
   dividing the music audio data set into a plurality of first possible pattern segments on the basis of provisional beat positions coinciding with the beat positions indicated by the acquired beat position information, each of the first plurality of first possible pattern segments constituted by a number of the provisional beat positions, and provide a plurality of sets of first possible pattern segments by dividing the music audio data set in accordance with first individual division models of a plurality of division models so that a first beat position of each of the first possible pattern segments is shifted with respect to each other;
   dividing the music audio data set into a plurality of second possible pattern segments on the basis of beat positions indicated by the beat position information equal in number to an integral multiple of the number of the provisional beat positions constituting the first possible pattern segments, and also provide a plurality of sets of second possible pattern segments by dividing the music audio data set in accordance with second individual division models of the plurality of division models so that a first beat position of each of the second possible pattern segments is shifted with respect to each other; and
   dividing the music audio data set into a plurality of third possible pattern segments on the basis of beat positions indicated by the beat position information equal in number to an integral submultiple of the number of the provisional beat positions constituting the first possible pattern segments, and also provide a plurality of sets of third possible pattern segments by dividing the music audio data set in accordance with third individual division models of the plurality of division models so that a first beat position of each of the third possible pattern segments is shifted with respect to each other;

a step of acquiring a plurality of reference performance patterns;

a step of making comparisons between individual possible pattern segments with individual reference performance patterns for each of the sets of first, second, and third possible pattern segments and, on the basis of each comparison, determining, for each of the possible pattern segments of the set, at least one respective reference performance pattern that matches the possible pattern segment;

a selection step of identifying at least one combination of reference performance patterns on the basis of the at least one respective reference performance pattern determined for each of the possible pattern segments, wherein each of the possible pattern segments within each of the sets of first, second, and third possible pattern segments is associated with one respective reference performance pattern, and selecting one optimal combination of reference performance patterns from among the at least one combination of reference performance patterns identified for the sets of first, second, and third possible pattern segments; and a correction step of correcting the beat positions in response to the selection of the one optimal combination of reference performance patterns by the selection step, wherein the beat positions are indicated by the beat position information acquired by said acquisition step, and wherein the correction step is configured to correct the beat positions if the one optimal combination selected by said selection step is a combination related to the second or third possible pattern segments.

11. The computer-implemented method as claimed in claim 10, which further comprises a step of determining positions of bar lines in the music audio data set to be analyzed, wherein the positions of bar lines are determined on the basis of the possible pattern segments that correspond to the one optimal combination selected by said selection step.

12. The computer-implemented method as claimed in claim 10, which further comprises a step of creating performance progression data describing, in a performance progression order, performance pattern identification information identifying individual reference performance patterns that constitute the one optimal combination of reference performance patterns selected by said selection step.

13. A non-transitory computer-readable medium containing a program for causing a processor to perform a method for analyzing a rhythm structure of a music audio data set, said method comprising:

an acquisition step of acquiring beat position information indicative of individual estimated beat positions of the music audio data set to be analyzed;

a division step of:
 dividing the music audio data set into a plurality of first possible pattern segments on the basis of provisional beat positions coinciding with the beat positions indicated by the acquired beat position information, each of the first plurality of first possible pattern segments constituted by a number of the provisional beat positions, and provide a plurality of sets of first possible pattern segments by dividing the music audio data set in accordance with first individual division models of a plurality of division models so that a first beat position of each of the first possible pattern segments is shifted with respect to each other;
 dividing the music audio data set into a plurality of second possible pattern segments on the basis of beat positions indicated by the beat position information equal in number to an integral multiple of the number of the provisional beat positions constituting the first possible pattern segments, and also provide a plurality of sets of second possible pattern segments by dividing the music audio data set in accordance with second individual division models of the plurality of division models so that a first beat position of each of the second possible pattern segments is shifted with respect to each other; and
 dividing the music audio data set into a plurality of third possible pattern segments on the basis of beat positions indicated by the beat position information equal in number to an integral submultiple of the number of the provisional beat positions constituting the first possible pattern segments, and also provide a plurality of sets of third possible pattern segments by dividing the music audio data set in accordance with third individual division models of the plurality of division models so that a first beat position of each of the third possible pattern segments is shifted with respect to each other;

a step of acquiring a plurality of reference performance patterns;

a step of making comparisons between individual possible pattern segments with individual reference performance patterns for each of the sets of first, second, and third possible pattern segments and, on the basis of each comparison, determining, for each of the possible pattern segments of the set, at least one respective reference performance pattern that matches the possible pattern segment;

a selection step of identifying at least one combination of reference performance patterns on the basis of the at least one respective reference performance pattern determined for each of the possible pattern segments, wherein each of the possible pattern segments within each of the sets of first, second, and third possible pattern segments is associated with one respective reference performance pattern, and selecting one optimal combination of reference performance patterns from among the at least one combination of reference performance patterns identified for the sets of first, second, and third possible pattern segments; and a correction step of correcting the beat positions in response to the selection of the one optimal combination of reference performance patterns by the selection step, wherein the beat positions are indicated by the beat position information acquired by said acquisition step, and wherein the correction step is configured to correct the beat positions if the one optimal combination selected by said selection step is a combination related to the second or third possible pattern segments.

14. The non-transitory computer-readable medium as claimed in claim 13, wherein said method further comprises a step of determining positions of bar lines in the music audio data set to be analyzed, wherein the positions of bar lines are determined on the basis of the possible pattern segments that correspond to the one optimal combination selected by said selection step.

15. The non-transitory computer-readable medium as claimed in claim 13, wherein said method further comprises a step of creating performance progression data describing, in a performance progression order, performance pattern identification information identifying individual reference performance patterns that constitute the one optimal combination of reference performance patterns selected by said selection step.

16. An apparatus for analyzing a rhythm structure of a music audio data set, comprising:

a storage medium storing a program;
a processor for executing the program, the processor, when executing the program, configured for:
 acquiring beat position information indicating individual estimated beat positions of the music audio data set to be analyzed;
 dividing the music audio data set into a plurality of first possible pattern segments on the basis of provisional beat positions coinciding with the beat positions indicated by the acquired beat position information, each of the plurality of first possible pattern segments constituted by a number of the provisional beat positions, and provide a plurality of sets of first possible pattern segments by dividing the music audio data set in accordance with first individual division models of a plurality of division models so that a first beat position of each of the first possible pattern segments is shifted with respect to each other;
 dividing the music audio data set into a plurality of second possible pattern segments on the basis of beat positions indicated by the beat position information equal in number to an integral multiple of the number of the provisional beat positions constituting the first possible pattern segments, and also provide a plurality of sets of second possible pattern segments by dividing the music audio data set in accordance with second individual division models of the plurality of division models so that a first beat position of each of the second possible pattern segments is shifted with respect to each other; and dividing the music audio data set into a plurality of third possible pattern segments on the basis of beat positions indicated by the beat position information equal in number to an integral submultiple of the number of the provisional beat positions constituting the first possible pattern segments, and also provide a plurality of sets of third possible pattern segments by dividing the music audio data set in accordance with third individual division models of the plurality of division models so that a first beat position of each of the third possible pattern segments is shifted with respect to each other;

acquiring a plurality of reference performance patterns;

making comparisons between individual possible pattern segments with individual reference performance patterns for each of the sets of first, second, and third possible pattern segments and, on the basis of each comparison, determining, for each of the possible pattern segments of the set, at least one respective reference performance pattern that matches the possible pattern segment;

identifying at least one combination of reference performance patterns on the basis of the at least one determined respective reference performance pattern for each of the possible pattern segments, wherein each of the possible pattern segments within each of the sets of first, second, and third possible pattern segments is associated with one respective reference performance pattern, and selecting one optimal combination of reference performance patterns from among the at least one combination of reference performance patterns identified for the sets of first, second, and third possible pattern segments; and correcting the beat positions in response to the selection of the one optimal combination of reference performance patterns, wherein the beat positions are indicated by the acquired beat position information, and correcting the beat positions if the one optimal combination of reference performance patterns is a combination related to the second or third possible pattern segments.

17. The apparatus as claimed in claim 16, wherein the processor, when executing the program, is configured for:

determining positions of bar lines in the music audio data set to be analyzed, wherein the positions of bar lines are determined on the basis of the possible pattern segments that correspond to the selected one optimal combination.

18. The apparatus as claimed in claim 16, wherein the processor, when executing the program, is configured for:

creating performance progression data describing, in a performance progression order, performance pattern identification information identifying individual reference performance patterns that constitute the one optimal combination of reference performance patterns selected.

19. The apparatus as claimed in claim 16, wherein the processor, when executing the program, is configured for:

calculating, for each of the sets of first, second, and third possible pattern segments, a degree of similarity of each of the possible pattern segments to each of the reference performance patterns, wherein the calculated degree of similarity of the at least one respective reference performance pattern for each of the possible pattern segments is relatively high.

20. The apparatus as claimed in claim 19, wherein the processor, when executing the program, is configured for:

evaluating, for each of the identified combinations of reference performance patterns, an overall evaluation value of the degree of similarity between the one or more reference performance patterns in the respective combination and the associated possible pattern segments in the respective combination, and selecting, as the one optimal combination, one of the identified combinations which has a relatively high overall evaluation value of the degree of similarity.

* * * * *